UNITED STATES PATENT OFFICE.

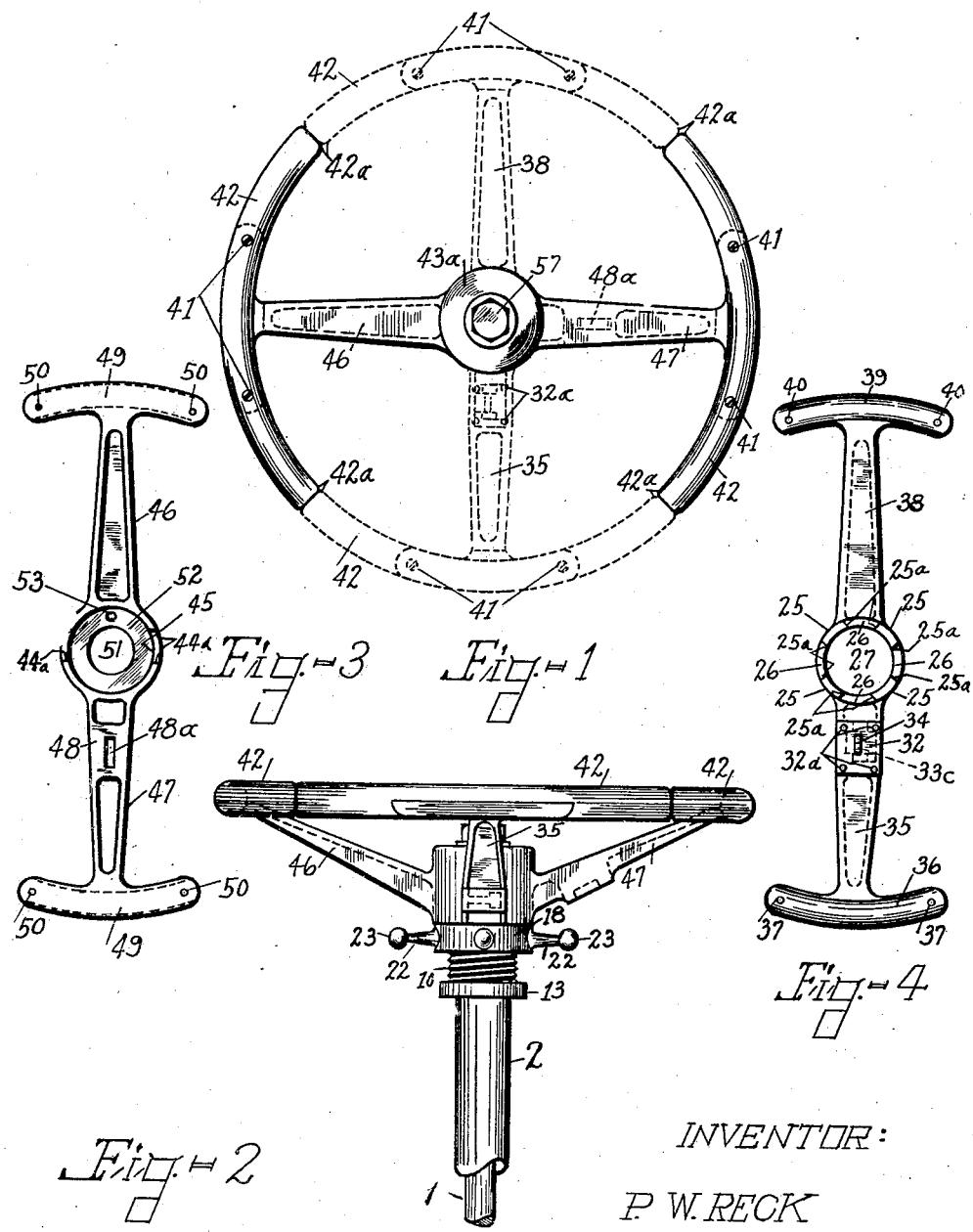

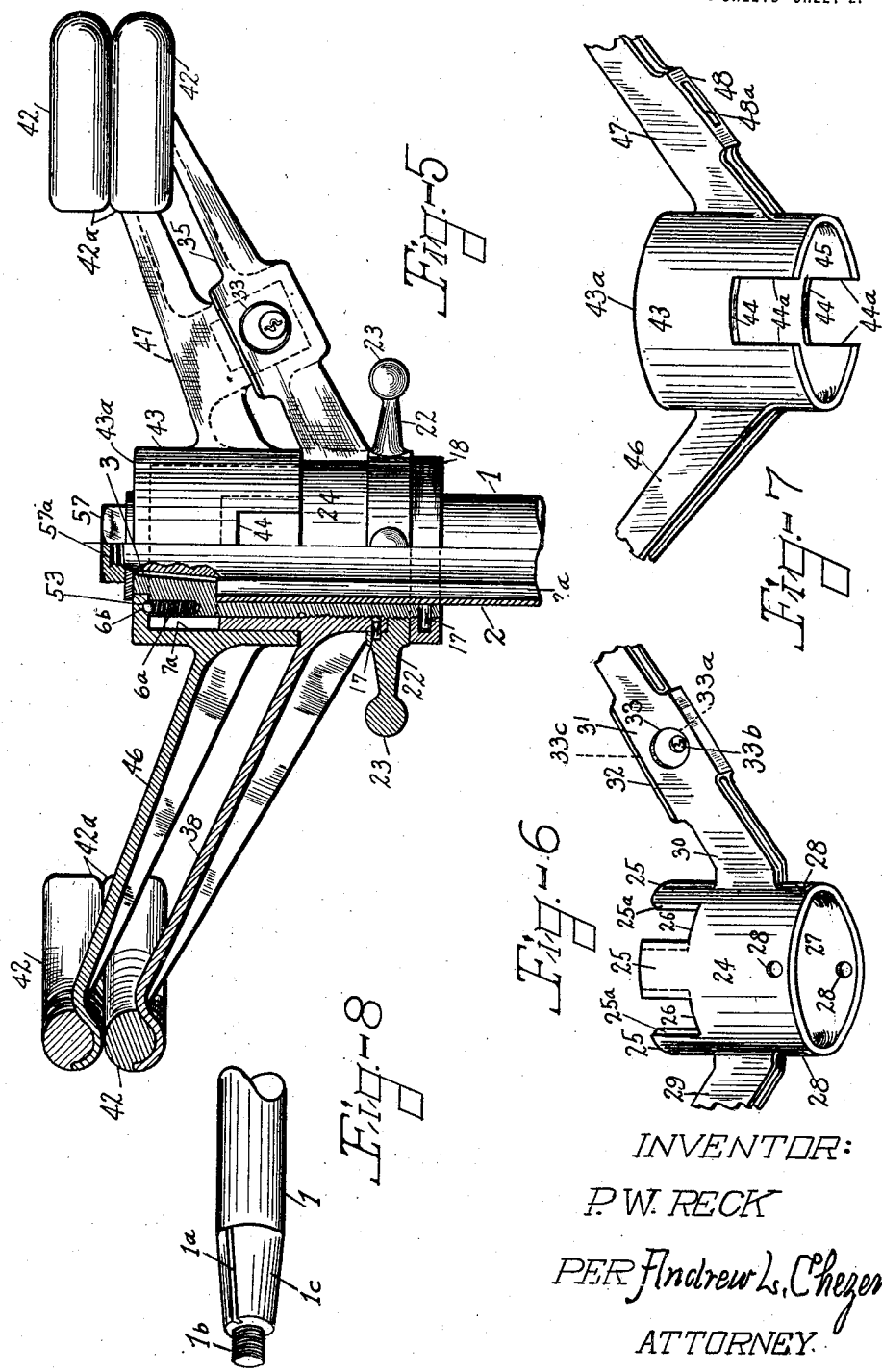

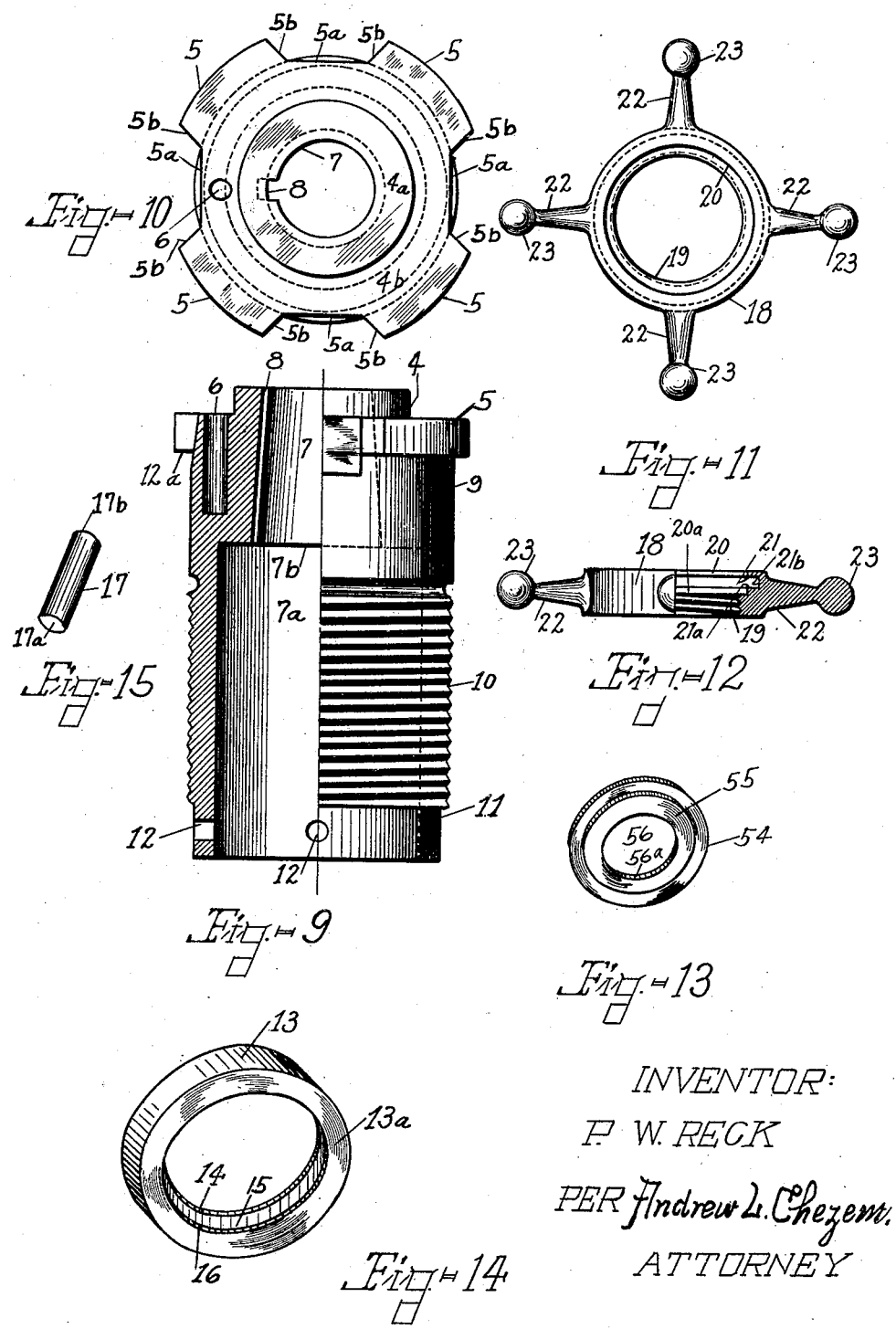

PETER W. RECK, OF BETTENDORF, IOWA.

DIVISIBLE LOCKING STEERING WHEEL.

1,426,773.  Specification of Letters Patent.  Patented Aug. 22, 1922.

Application filed July 14, 1919. Serial No. 310,725.

*To all whom it may concern:*

Be it known that I, PETER W. RECK, a citizen of the United States, residing at Bettendorf, in the county of Scott and State of Iowa, have invented a new and useful Divisible Locking Steering Wheel, of which the following is a specification.

My invention relates to improvements in steering wheels which are capable of being divided and locked.

The objects of my invention are, to provide a steering wheel capable of being divided; and revolved idly upon a steering post; and of having its parts locked unto each other in such way as to prevent effectively operating the steering rod of the machine; also rendering it easier to get in and out of a machine, and at the same time to provide an effective locking device, yet providing a wheel readily fixed effectively to the steering rod.

I attain these objects by the mechanism illustrated in the accompanying drawings, in which:

Figures 1 and 2 are respectively plan and side views of the wheel.

Figs. 3 and 4 are respectively bottom views of the upper and lower divisible hub members.

Fig. 5 is a side elevation of the wheel one-half in cross section.

Fig. 6 is a perspective view of the lower member, disclosing a broken portion of one of the spokes.

Fig. 7 is a perspective view of the upper member disclosing a broken portion of one of the spokes.

Fig. 8 is a perspective view of the upper end of a steering rod.

Fig. 9 is a plan view of the sleeve member in cross section.

Fig. 10 is a top plan view of the sleeve member.

Figs. 11 and 12 are plan views of the pilot, the latter showing the same partly in cross section in side elevation.

Figs. 13, 14 and 15 are respectively perspective views of the stop collar, washer and pin.

Similar numerals refer to similar parts throughout the several views.

My invention consists in part of a wheel as shown in Figs. 1, 2 and 5, having four spokes radiating in pairs respectively from hub members 43 and 24, each spoke numbered respectively 46, 47, 35 and 38; and bearing upon its outer end a quarter of the rim each quarter numbered 42 and spokes 35 and 38 radiate from lower hollow hub member 24.

Member 43 through hole means 43ª in its top, is loosely secured by nut 57 and washer 57ª and the threaded end 1ᵇ of steering rod 1, conjunctively and vibratorily upon the top of sleeve member 9 positioned with its skirt 45 enveloping the upper notched skirt 25 of lower member 24, to facilitate the fitting and operation of member 43 upon sleeve member 9. Sleeve member 9 is provided with a flatly flanged top 5 and a neck portion 4 on its top corresponding to the hole 43ª (not shown) in the top of hub member 43.

Hub member 43 has a pair of rectangular notches 44 cut in its skirt opposite each other positioned diametrically between its spokes 46 and 47, for the purpose of fitting engagingly over spokes 35 and 38 when lower member 24 is raised permitting the formation of a circular rim as shown in Fig. 2.

Sleeve 9 is fitted upon the end 1ᶜ of steering rod 1, by means of the boxing 7 suited to journaled end 1ᶜ of steering rod 1 and keyed thereon by key in slot 1ª of rod 1, thus supporting upper member 43 as aforesaid. The flange 5 of sleeve 9 is provided with four grooves 5ª having sharply angulate jaws 5ᵇ suited to receive the protruding portions of the skirt 25 of lower member 24; the edges 25ª of the notches 26 being suitably cut to fit the jaws 5ᵇ of flange 5. It will be observed that lower member 24 has notches 26 in its upper skirt, so positioned that they do not engage flanges 5 when the spokes are in apposition, as shown in Fig. 5, but do engage them when the spokes are divergent as shown in Fig. 2.

In addition to the tapering boxing 7 the inner portion or skirt of sleeve 9 is journaled 7ª and provided with a flange 7ᵇ at its top, to fit neatly upon the top end of a steering post 2 as shown in Fig. 2, the top end of the steering post being intended to rest snugly against flange 7ᵇ at the bottom end of boxing 7, the lower end portion 11 of the sleeve having holes 12 therein for the insertion of pins in securing the lower member 24 thereon by means of a stop collar 13 fitted on the lower end of said sleeve.

The stop collar 13 is a square faced ring inwardly grooved suitably to admit pin means (not shown) in the holes 12 of the sleeve, the pin operating between the inner wall 15 and side walls 14 and 16 of the stop collar and the outer surface of the steering post 2.

The outer surface of sleeve 9 has threads 10, over which lower member 24 operates upward and downward when mounted, moved by pilot 18, the threaded portion being suited to the length of the lower member 24 and sufficiently long that by operation of pilot 18 to cause the protruding portions 25 of the upper skirt of 24 to engage with or disengage with flanges 5 in grooves 5$^a$.

Pilot 18 is provided with plural protruding arms 22 suitable for turning it, the balls 23 on the ends of arms 22, being for ornamentation and to prevent injury to a person. The inner portion of the pilot is divided into a grooved portion 21 and a threaded portion 19 between side walls 20 and 21$^a$, the grooved portion 21 also having another subside wall 21$^b$, and it is operated upon sleeve 9 by means of its threads 10.

The groove 21$^b$ and upper side walls 20 and 20$^a$ of the groove in pilot 18 are made circumferentially larger than its opposite lower threaded side 19, suitably to receive the lower end of lower member 24 when the lower member is mounted on sleeve 9, and are used to hold lower member in place on sleeve 9 and regulate its upward and downward movement thereon by means of a pin 17, operating conjunctively in groove 21$^b$ through hole 28 of the lower member 24 against threaded portion 10 of the sleeve 9, when by revolution of the pilot its threaded portion 19 engages threads 10 of the pilot, causing an upward or downward movement of lower member 24 as desired, to cause its notched skirt 25 to engage or disengage with other portions of the mechanism as desired.

When spokes 47 and 35 are brought one above the other the lower member 24 may be forced upward until the spokes are brought longitudinally in contact with each other, when by means of a locking device imbedded in one of said spokes they may be locked unto each other, and the divided wheel be revolved aimlessly upon the sleeve 9.

It will be observed that the spokes 47 and 35 incline outward from the upper and lower hub members, the effect of which is that when the lock 33 which is provided in the lower arm member 35 is turned, to throw the bolt 34 outward, the bolt enters the cavity 48$^a$ at an angle which effectuates a lock preventing the slipping downward of lower member 24, and the lock seat 33$^c$ and cavity seat 48 being made rectangular fit flat, hiding the locking device 33 which is inserted from the top of spoke 35, as indicated in dotted lines in Fig. 5 and shown in Fig. 4. The lock is held in place when not in use by plate 32, by screw means 32$^a$, covering lock seat 33$^c$.

When spokes 35 and 47 are disengaged and the lower member 24 turned quarteringly as shown in Fig. 1, and lower member 24 is forced upward by pilot 18 and its upper notched skirt 25 engages flanges 5 the wheel is in working position. When the pilot 18 is lowered and the spokes are turned parallel the wheel will not guide the steering rod 1.

In order to aid the finding of flanges 5 by the notched skirt 25 as desired, I provide a finding-ball 6$^b$ which is seated upon a coil spring 6$^a$ in a milled hole 6 sunk in the upper surface of flange 5.

I claim:

1. A divisible locking steering wheel, having a rim divided into quarters, each quarter mounted on the end of a spoke.

2. In a steering mechanism, a steering post, a sleeve fixed to the upper end of the post, a divisible hub consisting of an upper and a lower member, each mounted on said sleeve, the lower hub member and sleeve having parts adapted to interlock in one position of the sleeve and means on the lower end of the sleeve adapted to force said hub member and sleeve into interlocking relation.

3. In a steering wheel having a pair of divisible hub members operated upon a sleeve member; a sleeve member capable of being firmly secured upon a steering rod by means of a neck portion protruding from its top and of being fitted securely over the upper end of a steering post at its skirt extremity, having on the outer periphery of its top a flange portion, such flange portion having in its edges notches suitable for receiving the notched skirt of the lower hub member, said sleeve member having a threaded portion on its outer surface spaced below said flanged portion, suitable for coaction with thread means, of a pilot member operated thereon, a skirt portion below said threaded portion said skirt portion being provided with a hole in its bottom suitable for use in attaching a stop collar thereon, the top of said sleeve being provided with multiple pot holes capable of receiving finding-ball means embedded therein between said top and the inner surface of the upper hub member, and journal means capable of rotatably receiving the said upper hub member when mounted thereon.

4. In a steering wheel a pair of hub members, spokes supported thereby, a lock carried by one of said spokes, and a second spoke provided with a cooperating lock recess.

5. In a steering wheel a pair of hub members, spokes supported thereby, a locking bolt mounted in the upper side of one of said spokes, and a second spoke formed with a recess in its underside for receiving said bolt.

6. In a steering wheel having a sleeve member capable of being secured upon a steering rod by means of a neck portion extended from the top of said sleeve and of having its skirt portion fitted over the upper end of a steering post, upon which sleeve member is operated a pair of hub members each capable of supporting spokes and a portion of a rim; a pilot member outwardly disposed upon said sleeve, said pilot member being secured by pin means operating within a groove within the inner periphery of the said pilot connectedly through the said skirt portion of the said lower hub member upon said sleeve, said pilot member being capable of being screwed upward and downward upon said sleeve by co-acting thread means in such manner as to carry with it the said lower hub member; and a stop collar member secured upon the bottom of said sleeve member capable of securing the said lower hub member and said pilot member movably upon said sleeve.

7. In a steering wheel having a pair of divisible hub members having spokes protruding from their sides, operated upon a sleeve member; a sleeve member having a neck portion reduced upwardly from its top in such manner as to serve as a means for securing said sleeve fixedly upon a steering rod and as a journal for a cap-hub member and having a bell skirt bottom portion suited to be closely fitted over the upper end of a steering post, said sleeve member also having a notched flange protruding at right angles from the outer periphery of its top; an upper hub member of cap form; having a center hole in its crown suited to form a boxing for the neck of said sleeve member, fitted cap end upward over the top and journaled end of said sleeve member, a multiplicity of square notches in cross section arranged in its skirt suitable to receive the spokes of said lower hub member; a lower hub member of band form, of diameter suitable to be capable of being moved upward and downward rotatably upon said sleeve member below said flange by means of a pilot member and to pass between the sleeve and the skirt of the upper cap hub member, having multiple square notch means provided in the upper periphery of its skirt above the parallel of the upper axiliary line of said spokes, suitable for engagement with the notched flanges of the said sleeve member, multiple hole means provided in its skirt below the parallel of the lower auxiliary line of said spokes suitable for receiving the attaching means of said pilot member; stop collar means suitable for securing said lower hub member and said pilot member upon said sleeve and secured upon the bottom of the skirt thereof by pin means; nut means suitable for attaching said upper cap hub member rotatably upon the neck portion of said sleeve member.

PETER W. RECK.

Witnesses:
A. G. SAMPSON,
GRACE A. JOHANSEN.